United States Patent [19]

Strack et al.

[11] Patent Number: 5,461,320
[45] Date of Patent: Oct. 24, 1995

[54] CAPACITIVE MEASURING DEVICE FOR DETERMINING DISPLACEMENT BY EVALUATING THE CHANGE IN THE BASIC FREQUENCY

[75] Inventors: Peter Strack, Luneville; Andreas Kaiser, Villeneuve-D'Ascq, both of France

[73] Assignee: Tesa S.A., Switzerland

[21] Appl. No.: 231,259

[22] Filed: Apr. 22, 1994

[30] Foreign Application Priority Data

Apr. 23, 1993 [DE] Germany ............... 43 13 344.4

[51] Int. Cl.$^6$ ............... G01R 27/26; G08C 19/10
[52] U.S. Cl. ............... 324/662; 324/660; 324/681; 340/870.37
[58] Field of Search .................. 324/660, 661, 324/662, 676, 681, 207.17, 207.24, 160; 340/870.26, 870.37

[56] References Cited

U.S. PATENT DOCUMENTS

| 4,743,902 | 5/1988 | Andermo | 324/662 |
| 5,053,715 | 10/1991 | Andermo | 324/662 |
| 5,065,105 | 11/1991 | Bruere et al. | 324/662 |
| 5,122,755 | 6/1992 | Nootbaar et al. | 324/681 X |

FOREIGN PATENT DOCUMENTS

| 0248165 | 12/1987 | European Pat. Off. . |
| 0184584B1 | 9/1991 | European Pat. Off. . |
| 2218824 | 6/1974 | Germany . |
| 2853142C3 | 5/1988 | Germany . |
| 651136A5 | 8/1985 | Switzerland . |

Primary Examiner—Kenneth A. Wieder
Assistant Examiner—Diep Do
Attorney, Agent, or Firm—Scully, Scott, Murphy & Presser

[57] ABSTRACT

A capacitive measuring device or apparatus; in particular, a length-measuring apparatus, which incorporates a scale portion and a scanning unit which is movable relative to the former and which supports transmitting electrodes and at least one receiving electrode. Herein, a transmission circuit applies transmitting signals at a basic frequency to the transmitting electrodes, and with the receiving electrode being connected to a reception circuit, to the output side of which there is connected an evaluating circuit for the receiving signals. The transmitting signals are applied to the transmitting electrodes through a pulse width modulator and a synchronous modulator and the receiving signal is conducted through a demodulator. The synchronous modulator and demodulator operate at the same modulation frequency, which is higher than the basic or basic frequency; and when the scanning unit is at a standstill relative to the scale portion, the base frequency of the receiving signal is equal to the base frequency of the transmitting signals, and upon movement of the scanning unit relative to the scale portion the basic frequency of the receiving signals changes in conformance with the speed of movement relative to the basic frequency of the transmitting signals, whereby a change in frequency is evaluated by the evaluating circuit so as to display the length or extent of the movement.

12 Claims, 3 Drawing Sheets

CAPACITIVE MEASURING DEVICE FOR DETERMINING DISPLACEMENT BY EVALUATING THE CHANGE IN THE BASIC FREQUENCY

BACKGROUND OF THE INVENTION

1. Field of the Invention

The present invention relates to a capacitive measuring device or apparatus; in particular, a length-measuring apparatus, and incorporates a scale portion and a sensing unit which is movable relative to the former and which supports transmitting electrodes and at least one receiving electrode. Herein, a transmission circuit applies transmitting signals at a base frequency to the transmitting electrodes, and with the receiving electrode being connected to a reception circuit, to the output side of which there is connected an evaluating circuit for the receiving signals.

2. Discussion of the Prior Art

For instance, capacitive measuring apparatuses of the above-mentioned kind are employed in connection with slide-rule gauges or caliper scales. The scale portion is formed by capacitor plates which provide for the capacitive coupling between the transmitting electrodes and the receiving electrode or electrodes, which are similarly formed by condenser coatings or capacitor plates. Upon a movement of the scanning or sensing unit relative to the scale portion, there changes the capacitive coupling between the transmitting electrodes and the receiving electrodes. This aspect is evaluated for displaying the positions of the displacement.

A measuring apparatus of the foregoing type is described in European Patent Appln. EP 0 184 584 B1. In that instance, three transmitting electrodes are supplied with three AC-voltages which are each phase-shifted by respectively 120°, and are especially sinusoidal in nature. These voltages can be generated in a transmitting circuit from rectangular or square-wave signals. However, it is also possible to contemplate a supply of digital signals which contain only harmonics of higher orders which can be readily filtered out.

In the disclosure of EP 0 184 584 B1 there is utilized the phase shift between the transmitting signal and the receiving signal, which is encountered during the displacement of the scanning or sensing unit relative to the scale portion, in order to determine the local or positional displacement. Inasmuch as the electronic components of the measuring apparatus themselves can lead to phase shifts, there must be counted upon the occurrence of errors in measurement, which are difficult to control. Moreover, it is also expensive or complex to generate a plurality of sinusoidal signals possessing the same amplitude and with a precise phase shift. In the case of rectangular or square-wave signals, the harmonics of high-amplitude give rise to comparatively large interpolation errors.

In addition to the foregoing, the above-mentioned known circuit is susceptible to external interference signals. The reception signals must, as a result, have to be shielded against possible interference signals; for example, including signals emanating from an LCD-display. This considerably increases the demand on expenditures for components, and therewith the manufacturing costs.

German Patent No. 28 53 142 describes another capacitive measuring apparatus for determining the relative position of two members which are mutually displaceable relative each other. In that apparatus, sinusoidal voltages are generated at the transmitting end by an oscillator, and these are then applied to the transmitting electrodes. The phase shift of the measurement signal at a displacement of the scanning or sensing unit relative to the scale portion, is evaluated for purposes of measurement. The direction of the displacement is determined through a counter whose count condition increases or lowers in dependence upon the displacement. In this instance, there are also encountered the difficulties as set forth in connection with EP 0 184 584 B1.

German Published Patent Appln. No. 22 18 824 also describes a method of measuring the displacement of an electrode of a differential capacitor relative to other electrodes.

SUMMARY OF THE INVENTION

Accordingly, it is an object of the present invention to provide a capacitive measuring device or apparatus of the kind set forth hereinabove, in which the system-caused errors in measurement are reduced, so as to be able to improve upon the precision or accuracy of measurement in a simple manner.

Pursuant to the invention, this object is attained in a capacitive measuring apparatus of the kind set forth, in that the transmitting signals are applied to the transmitting electrodes through a pulse width modulator and a synchronous modulator and the receiving signal is conducted through a synchronous modulator and demodulator. The synchronous modulator and demodulator operate at the same modulation frequency, which is higher than the base or basic frequency; and when the scanning unit is at a standstill relative to the scale portion, the base frequency of the receiving signal is equal to the base frequency of the transmitting signals, and upon movement of the scanning unit relative to the scale portion the base frequency of the receiving signals changes in conformance with the speed of movement relative to the base frequency of the transmitting signals, whereby the change in frequency is evaluated by the evaluating circuit so as to display the length or extent of the movement.

The invention affords a genuine synchronous modulation and, respectively, synchronous demodulation, because the modulator and the demodulator lie at exactly the same frequency. This stands in contrast with a "synchronous modulation" as in the case of radio reception wherein the transmitter and the receiver are spatially separated from each other.

According to the present invention, it is not the phase position of the receiving signals with respect to the transmitting signal which is evaluated for the measurement, but rather there are evaluated the changes in the frequency of the receiving signal with regard to the transmitting signal, which are dependent upon the relative movement between the scale portion and the transmitting and receiving electrodes. This change in the frequency can be considered as a Doppler effect. Upon a movement in the one direction, the receiving frequency is increased in comparison with the transmitting frequency; whereas at a movement in the opposite direction, the receiving frequency is lowered in comparison with the transmitting frequency.

Due to the fact that it is not the phase position but rather the change in frequency which is evaluated for purposes of measurement, the properties of the components of the measuring apparatus which tend to influence the phase position, do not have any effect over the result of the measurement.

Overall, the degree in the measuring accuracy is therefore improved inasmuch as the sensitivity to noise and interference is reduced.

In the instance of the presently described apparatus, only the relative movement between the scale portion and the scanning unit is of significance. Either the scale portion or the scanning unit may be permitted to remain stationary. The relative movement may be either a linear or a circular motion.

BRIEF DESCRIPTION OF THE DRAWINGS

Advantageous aspects and features of the invention are now set forth with respect to the following description of a preferred embodiment, taken in conjunction with the accompanying drawings; in which.

DETAILED DESCRIPTION

Figure 1:
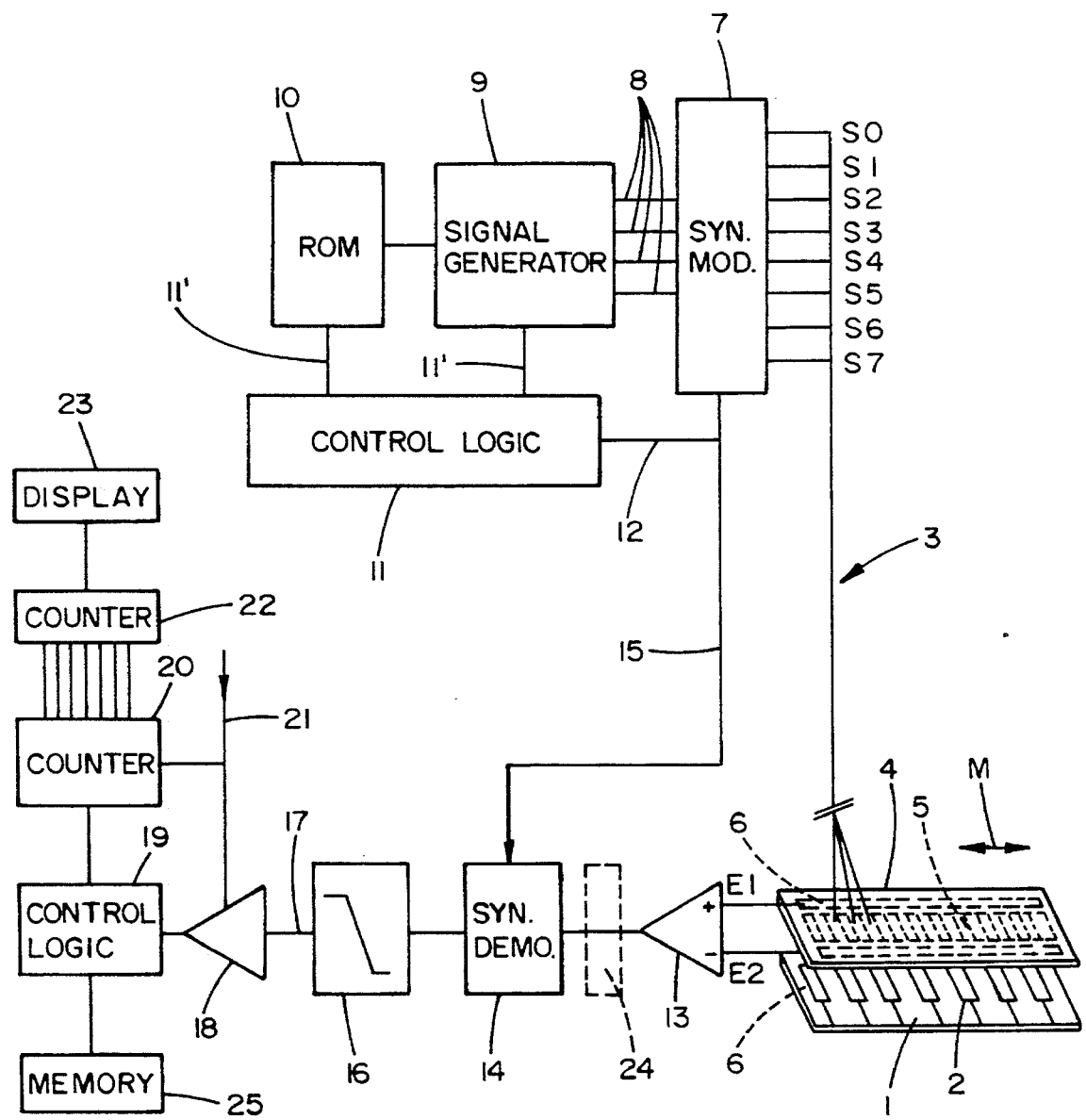
FIG. 1 schematically illustrates a block circuit diagram of the inventive capacitive measuring apparatus.

The measuring device or apparatus possesses a scale portion 1 which extends over the measurement distance. The scale portion 1 carries capacitor plates or coatings 2. A scanning or sensing unit 3 includes a carrier or substrate 4 on which are arranged transmitting electrodes 5, in the exemplary embodiment consisting of eight transmitting electrodes, and at least one receiving electrode 6, in the exemplary embodiment consisting of two receiving electrodes. Such an arrangement is described in more specific detail in EP 0 184 584 B1. The carrier 4 with the scanning unit 3 is displaceable relative to the scale portion 1 within the measurement region defined by the double-headed arrow M.

Connected to the transmitting electrodes 5 are the outputs S0 to S7 of a synchronous modulator 7, to which there is connected a signal generator 9 through four (eight) lines 8, whereby the signal generator 9 is controlled by an ROM storage 10. The signal generator 9 and the memory storage 10 are connected through the intermediary of pulse synchronizing lines 11' to a control logic unit 11, which through a line 12 applies a modulation frequency to the synchronous modulator 7.

Figure 2:
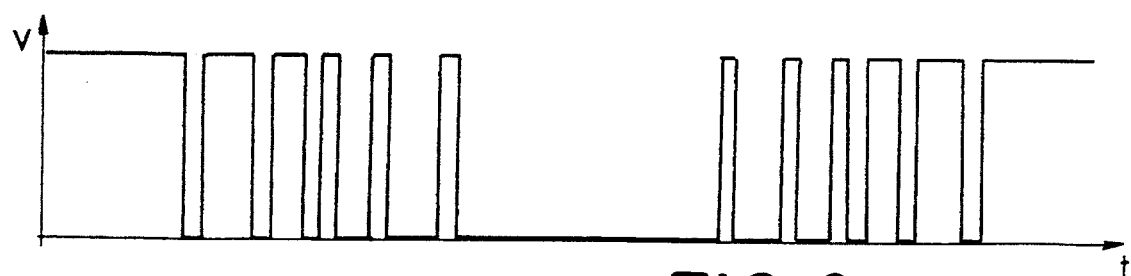
FIG. 2 shows a graphical plot illustrating a pulse width-modulated signal with low third harmonic prior to synchronous modulation.

In its lines 8, the signal generator 9 generates rectangular or square-wave pulse width-modulated signals of constant amplitude (as shown in FIG. 2), wherein the pulse width modulation corresponds in a rough approximation to a sine function. The base frequency of the function is 300 Hz in the present exemplary case. The respective pulse widths are stored in the memory 10 and are read out from the latter. The ratios of the pulse widths are determined in the memory 10 such that downstream of a low-pass filtering (referring to low-pass filter 16), there is produced a signal in which the third harmonic of the base frequency is as low as possible (referring to FIG. 2). The higher harmonics can be disregarded, inasmuch as they are eliminated by a fourth-order low-pass filter.

The pulse width-modulation signals (as in FIG. 2) of the lines 8 are equal, however, the base frequency of each signal is phase-shifted by 45°. This phase shift is achieved by a suitable displacement of the addresses of the memory 10. When eight transmitting signals are involved, the first four signals are produced in this manner; the other four signals are an inversion of the first four signals.

Figure 3:
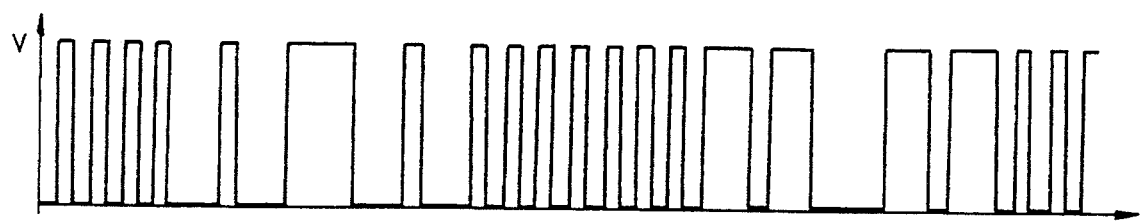
FIG. 3 shows a graphical plot illustrating pulse width-modulated and synchronous-modulated transmitting signal.

The modulation frequency is higher than the basic frequency by a multiple; for example, by a factor of 64. With a basic frequency of 300 Hz, the modulation frequency consists then of 19,200 Hz. FIG. 3 shows one of the pulse width-modulated signals after synchronous modulation. This signal is applied to one of the transmitting electrodes S0 to S7. The same kind of signals are then applied to the other transmitting electrodes, but with a phase shifted base frequency Synchronous modulation of the pulse width-modulated rectangular signals reduces the effect of any interference phenomena which can intervene between the transmitting electrodes 5 and the receiving electrodes 6. The synchronous modulator 7 can operate with exclusive-OR-gates in order to provide the desired synchronous modulation.

The receiving electrode 6 is connected to an amplifier 13. When the arrangement is also equipped with a second receiving electrode, then the latter is connected to a second input of the amplifier 13, wherein the first receiving signal is E1 and the second receiving signal E2 corresponds to the inversion or reversal of the first receiving signal E1.

Figure 4:
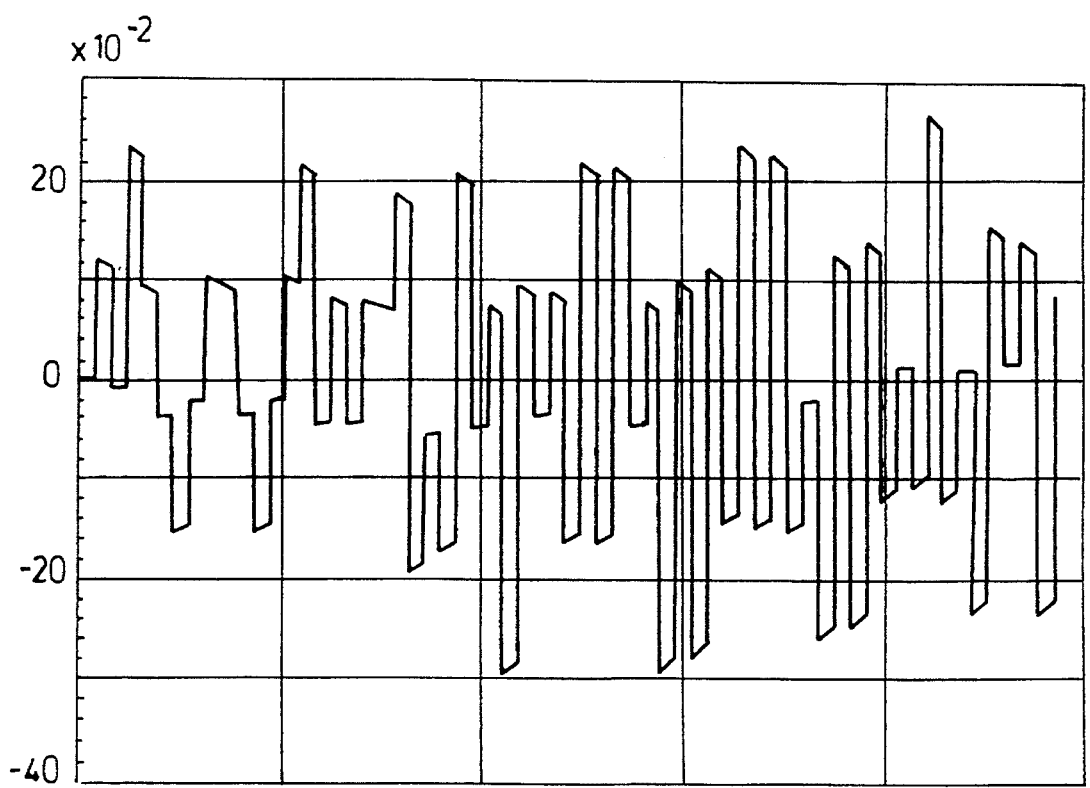
FIG. 4 shows a plot of a receiving signal at the input of an amplifier.

The receiving signals E1, E2 are then demodulated in a synchronous demodulator 14 which is connected to the output side of the amplifier 13. One of the receiving signals E1 at the input of the amplifier 13 is shown in FIG. 4. It can be ascertained from FIG. 3 that because of that modulation in series at least three different frequencies are applied to the transmitting electrodes. The demodulator 14 lies through a line 15 at the same modulation frequency as the synchronous modulator 7. The synchronous modulator 7, in cooperation with the demodulator 14, eliminates any interference signals acting on the receiving electrodes 6 and whose frequency is generally substantially lower than the modulation frequency (for example, interference signals from an LCD-display of the measuring apparatus), because the amplitudes of the interference signals of the varying polarities of the modulation frequency occur at the demodulator 14 and therefore average each other out. Higher-frequencied interference phenomena are eliminated by the low-pass filter 16.

A low-pass filter 16 is connected to the output side of the demodulator 14. Accordingly, the sum of all of the signals from the transmitting electrodes 5 is encountered at the filter 16. The low-pass filter 16; for example, is a linear fourth-order low-pass filter. At its output 17 there is present a very clean analog sine signal at a basic frequency of 300 Hz, which corresponds to the signal transmitted in pulse width-modulated form on the lines 8 or the pulse width-modulated and frequency-modulated transmission signal of the transmitting electrode 5.

Connected to the output 17 is a comparator 18 which converts the analog sine signal into a corresponding rectangular or square-wave signal having the same frequency. The stated equality of the base frequency (300 Hz) of the sine signal at the output 17 with the base frequency of the signal generator 9 occurs when the carrier 4 is stationary relative to the scanning unit 3. The description set forth hereinafter applies to the measuring operation.

The comparator 18 is connected at its output to a control logic unit 19 which, in turn, is connected to a counter 20. Connected to the counter 20 is a synchronizing or timing line 21 which pulses the counter 20 at a frequency which is substantially higher than that of the base frequency. The timing frequency is; for example, 512 times ($2^9$) the base frequency. This clock frequency is approximately of or at the same magnitude as the pulsing frequency which is applied to the pulsing or timing lines (11') of the memory 10 and of the signal generator 9. The pulsing line 21 is also connected to the comparator 18.

At each positive or each negative side slope or edge of the output signal of the comparator 18, the counter 20 is set to a negative value. The magnitude of that value depends upon the desired interpolation factor. In the case which is given by way of an example, the counter is set at each positive slope or edge to "–512", which corresponds to an interpolation factor or a degree of resolution of 10 bits. If a higher or lower degree of resolution is desired, there is utilized a suitably different value or a suitably different pulsing frequency. When in an exemplary case, a 300 Hz-signal is applied to the comparator 18, then during that signal the counter 20 counts down by 512 steps back to a value of 0, which is then evaluated for display purposes. This is the case when there is no displacement of the carrier 4 relative to the scale portion 1. Consequently, the resolution of the comparator 18 is being synchronized with the pulsing frequency of the counter 20.

When, during a measuring operation, the carrier 4 is displaced relative to the scale portion 1, then the frequency of the sine signal at the comparator 18 changes relative to the base frequency (300 Hz) in conformance with the speed of displacement per unit of time. The base frequency of 300 Hz is sufficient to achieve an adequate degree of resolution with speeds of displacement in the order of magnitude of up to about 1.5 m/s.

When the movable member; for instance, the carrier 4, is displaced in one direction relative to the stationary scale portion 1, then the frequency at the comparator 18 increases. If it is displaced in the other direction, the frequency at the comparator 18 drops off accordingly. When there is present at the comparator 18 a receiving frequency which is higher than the basic frequency at the signal generator 9, then the counter 20 reaches a negative value which differs from zero. If the receiving frequency at the generator 18 is lower than the base frequency at the signal generator 9, then the counter 20 reaches a positive value which differs from zero, in which case the deviation of the counter from zero shows the distance of displacement of the carrier 4 relative to the scale portion 1, which is then evaluated for display purposes.

The count condition which is currently achieved in the counter 20 within a period is transmitted to a superordinated counter 22 and added therein to the preceding values (or respectively subtracted therefrom). The count condition of the counter 22 can then be represented on a display device 23; for example, on an LCD-display.

It is also advantageous that, in the instance of the present invention, the offset voltage of the comparator 18 does not exert an effect over the results of the measurement, because, for the measuring operation, the instantaneous change in the frequency of the demodulated and filtered receiving signal is evaluated, and phase shifts which are occasioned by components of the apparatus exert hardly any effect over the results of the measurement. There is also present the advantage that the direction of the displacement of the movable member relative to the stationary member of the measuring apparatus is automatically derived from the positive or negative change in the frequency. Also provided is the advantage that, because of a frequency modulation, the capacitive path between the transmitting electrodes 5 and the receiving electrodes 6 is not disturbed by low-frequency signals; for example, from the LCD-display device, the power mains, any fluorescent lamps, or the like. In addition, the power consumption of the measuring apparatus is also lower than that in the current state-of-the-art, which is an important consideration, especially in the instance of battery-powered measuring devices.

The absence of any sensitivity of the measuring device or apparatus to interference phenomena can be further enhanced by connecting a band-pass filter 24, which is shown by phantom lines in FIG. 1, between the amplifier 13 and the demodulator 14. The bandwidth of the band-pass filter 24 is approximately four times that of the base frequency; in essence, 1.2 kHz. The band-pass filter 24 is designed for an average frequency which is equal to that of the modulation frequency, in effect, respectively approximately 20 kHz and 19.2 kHz. The band-pass filter 24 suppresses all interference frequencies which act on the receiving electrodes 6 and which lie outside the bandwidth of the band-pass filter 24.

A higher degree of resolution of the displacements which occur during the measuring operation can be achieved by a higher level of resolution of the receiving signal which is detected by the comparator 18, or the changes in that signal relative to the basic frequency. For that purpose, the pulsing frequency of the counter 20 and the comparator 18 can be increased. A comparator 18 with a higher level of resolution; for example, of 14 bits and a correspondingly faster counter would, however, result in a higher level of power consumption, which is undesirable in the use of battery-powered devices.

Figure 5:
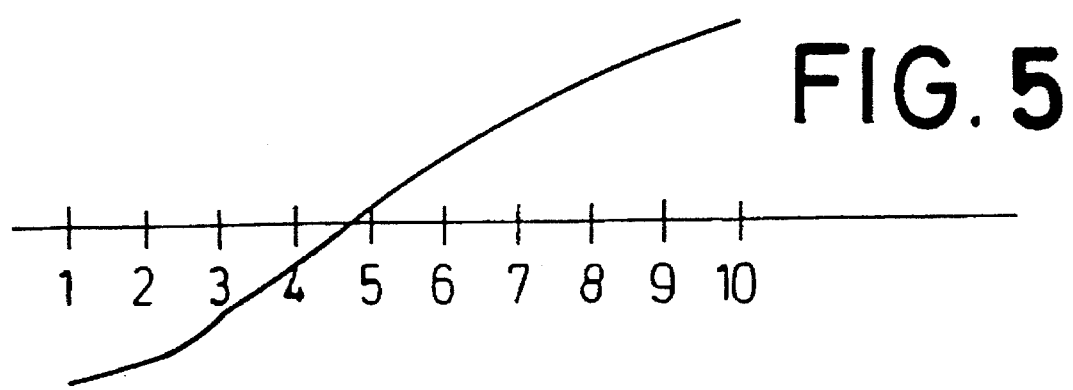
FIG. 5 shows a portion of a receiving signal at 'n' scannings of the LSB of the comparator.

In order to be able to achieve a higher level of resolution without necessitating a higher power consumption, provision can be made that a plurality, in effect, "n", of measurements are performed with the comparator with a 10-bit resolution, and the results of the measurement of the "n" measurements are summed. In the case of a fast movement, the apparatus measures with the described degree of resolution. For the higher degree of resolution, it is presumed that the receiving frequencies downstream of the low-pass filter differ only slightly from the basic frequency; in essence, the movable member is moving only slowly or may even be stationary. The receiving signal is then sampled "n" times and the window of the comparator is displaced by 1/n at each of the n measurements. When n=10, the level of resolution can be increased by a factor of 10. Due to the displacement of the window, the passage through zero is detected more accurately, whereby the level of resolution is increased. In the embodiment shown in FIG. 5, the counter 20 counts to 511 four times and to 512 six times, which provides a value of 4 for the highest-resolution decimal, with n=10.

The advantage is that a 10-bit comparator provides the same level of resolution as that of a 14 bit-resolution comparator, and wherein the power consumption of both the comparator 18 and also the counter 20 is lower. The maximum speed of displacement is not reduced thereby and the structure with respect to signal generation and filtering remains unchanged.

With the eight transmitting signals which are utilized through the transmitting electrodes S0 to S7, the arrangement must calculate on a linearity error of 1.1% of the length of a rectangular transmitting electrode. This linearity error can be disregarded at an interpolation factor of 512. With higher interpolation factors, this systematic and repeatable interpolation error can be corrected through a compensation.

The compensation has as a prerequisite that the relative position of the receiving electrodes is known with regard to the transmitting electrodes. This position is determined to a degree of accuracy of about 2° by a measurement of the phase shift between the transmitting and the receiving signals. On the basis of this positional information, a corrective value can be read out of a further ROM-storage or memory 25 and added to the measurement value of the counter 20.

Linear fourth-order low-pass filters with a low power consumption evidence a relatively high inherent phase shift. That inherent phase shift can also be taken into account by a suitable addressing of the memory 25. This can be effected by an in-phase signal being applied to all transmitting electrodes before each zeroing of the superordinated counter 22, and measuring the phase shift between the transmitting and receiving signals. The result corresponds to the phase shift of the analog components of the apparatus and is taken into consideration when computing the addresses of the memory 25. The advantage hereby resides in that it is possible to achieve a better linearity without having to multiply the number of transmitting electrodes.

What is claimed is:

1. A capacitive measuring apparatus, such as a length measuring apparatus, comprising a scale portion and a scanning unit which is movable relative to said scale portion, said scanning unit having transmitting electrodes and at least one receiving electrode; a transmitting circuit for applying transmitting signals at a basic frequency to the transmitting electrodes, said at least one receiving electrode being connected to pass a receiving signal a receiving circuit, an evaluating circuit connected to an output of the receiving circuit; a pulse width modulator and a synchronous modulator for applying the transmitting signals to the transmitting electrodes; a demodulator for demodulating the receiving signal, said synchronous modulator and said demodulator operating at the same modulation frequency which is higher than the basic frequency, wherein upon the scanning unit being stationary relative to the scale portion the basic frequency of the receiving signal is equal to the basic frequency of the transmitting signals, and upon movement of the scanning unit relative to the scale portion the basic frequency of the receiving signal changes pursuant to the speed of movement relative to the basic frequency of the transmitting signals and the change in frequency is evaluated by the evaluating circuit so as to display the extent of the movement.

2. A measuring apparatus as claimed in claim 1, wherein the transmitting signals which are supplied to the synchronous modulator at the basic frequency are pulse width-modulated rectangular signals having an approximate sine function, in which a third harmonic is maintained low.

3. A measuring apparatus as claimed in claim 2, wherein a signal generator for the generation of the pulse width-modulated rectangular signals is controlled by an ROM-memory.

4. A measuring apparatus as claimed in claim 1, wherein a receiving signal and an inverted receiving signal is applied to an input of the demodulator.

5. A measuring apparatus as claimed in claim 1, wherein there are generated at least six transmitting signals which are respectively phase-shifted relative to each other in the basic frequency at the same angular spacing.

6. A measuring apparatus as claimed in claim 1, wherein a low-pass filter is connected to the output of the demodulator, said low-pass filter having an output at which there is a sinusoidal receiving signal which, when the scanning unit is stationary relative to the scale portion, is at the basic frequency of the transmitting signal, and when the scanning unit moves relative to the scale portion is at a frequency which differs from the basic frequency positively or negatively depending upon the respective direction of movement.

7. A measuring apparatus as claimed in claim 6, wherein a comparator is connected to the output of the low-pass filter, said comparator forming a rectangular signal from the sinusoidal receiving signal which is synchronized with a counter for achieving a desired resolution.

8. A measuring apparatus as claimed in claim 7, wherein the counter is connected to the output of the comparator, the counter at each passage through zero of the receiving signal being set to a value from which the counter continues to count pursuant to the respective frequency of the receiving signal.

9. A measuring apparatus as claimed in claim 8, wherein the condition of the counter during each period of a basic wave is subjected to further processing through a further counter for displaying the result of measurement.

10. A measuring apparatus as claimed in claim 1, wherein a band-pass filter is selectively connected ahead of the demodulator.

11. A measuring apparatus as claimed in claim 8, wherein a corrective value corresponding to a linearity error is added to the counter for the measurement value.

12. A measuring apparatus as claimed in claim 7, wherein the receiving signal is sampled "n" times and within each of the "n" measurements the window of the comparator is displaced by 1/n, whereby a plurality of measurements are carried out with the comparator affording a 10-bit resolution and a summing of the measurement results of the "n" measurements.

* * * * *

UNITED STATES PATENT AND TRADEMARK OFFICE
CERTIFICATE OF CORRECTION

PATENT NO. : 5,461,320
DATED : October 24, 1995
INVENTOR(S) : Peter Strack, et al.

It is certified that error appears in the above-indentified patent and that said Letters Patent is hereby corrected as shown below:

Column 7, line 31, Claim 1: "signal a" should read --signal to a--

Signed and Sealed this

Ninth Day of July, 1996

Attest:

BRUCE LEHMAN

Attesting Officer      *Commissioner of Patents and Trademarks*